(12) United States Patent
Breen et al.

(10) Patent No.: US 10,746,850 B2
(45) Date of Patent: *Aug. 18, 2020

(54) MULTI-CHIP TRANSCEIVER TESTING IN A RADAR SYSTEM

(71) Applicant: Texas Instruments Incorporated, Dallas, TX (US)

(72) Inventors: Daniel Colum Breen, Richardson, TX (US); Brian Paul Ginsburg, Allen, TX (US); Krishnanshu Dandu, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/112,351

(22) Filed: Aug. 24, 2018

(65) Prior Publication Data

US 2019/0004148 A1    Jan. 3, 2019

Related U.S. Application Data

(63) Continuation of application No. 14/870,252, filed on Sep. 30, 2015, now Pat. No. 10,061,015.

(51) Int. Cl.
*G01S 7/40* (2006.01)
*G01S 7/35* (2006.01)
(Continued)

(52) U.S. Cl.
CPC ............ *G01S 7/4004* (2013.01); *G01S 7/032* (2013.01); *G01S 7/35* (2013.01); *G01S 7/4056* (2013.01); *G01S 13/87* (2013.01); *G01S 13/34* (2013.01); *G01S 13/343* (2013.01); *G01S 13/931* (2013.01); *G01S 2007/4069* (2013.01); *G01S 2013/0245* (2013.01)

(58) Field of Classification Search
CPC combination set(s) only.
See application file for complete search history.

(56) References Cited

U.S. PATENT DOCUMENTS 4,319,247 A    3/1982  Warren
5,160,933 A    11/1992 Hager
(Continued)

OTHER PUBLICATIONS

Karthik Subburaj et al. "Measurement of Transceiver Performance Parameters in a Radar System," U.S. Appl. No. 14/870,129, filed on Sep. 30, 2015 (43 pages).

(Continued)

*Primary Examiner* — Mamadou L Diallo
(74) *Attorney, Agent, or Firm* — Michelle F. Murray; Charles A. Brill; Frank D. Cimino

(57) ABSTRACT

A radar system is provided that includes a first radar transceiver integrated circuit (IC) including transmission signal generation circuitry operable to generate a continuous wave signal and a first transmit channel coupled to the transmission generation circuitry to receive the continuous wave signal and transmit a test signal based on the continuous wave signal, and a second radar transceiver IC including a first receive channel coupled to an output of the first transmit channel of the first radar transceiver IC via a loopback path to receive the test signal from first the transmit channel, the second radar transceiver IC operable to measure phase response in the test signal.

20 Claims, 3 Drawing Sheets

(51) Int. Cl.
*G01S 13/87* (2006.01)
*G01S 7/03* (2006.01)
G01S 13/931 (2020.01)
G01S 13/34 (2006.01)
G01S 13/02 (2006.01)

(56) References Cited

U.S. PATENT DOCUMENTS

| | | |
|---|---|---|
| 5,223,840 A | 6/1993 | Cronyn |
| 5,300,934 A | 4/1994 | Asbell et al. |
| 5,461,389 A | 10/1995 | Dean |
| 6,437,730 B1 | 8/2002 | Orlandi |
| 7,103,383 B2 | 9/2006 | Ito |
| 7,724,182 B2 | 5/2010 | Inoue et al. |
| 2006/0132357 A1 | 6/2006 | Pozgay et al. |
| 2008/0036660 A1 | 2/2008 | Matsuoka et al. |
| 2012/0050094 A1 | 3/2012 | Nakabayashi et al. |
| 2014/0333474 A1 | 11/2014 | Henderer |
| 2016/0161605 A1* | 6/2016 | Liu .................. G01S 13/66 342/59 |
| 2016/0320481 A1* | 11/2016 | Ling .................. G01S 7/006 |
| 2016/0341822 A1* | 11/2016 | Wang .................. B60L 50/66 |
| 2017/0023663 A1 | 1/2017 | Subburaj et al. |
| 2018/0267164 A1* | 9/2018 | Schwert ............... G01S 13/931 |

OTHER PUBLICATIONS

Patent Prosecution History for U.S. Appl. No. 14/870,252, dated Sep. 30, 2015 to Aug. 10, 2018 (140 pages).

* cited by examiner

MULTI-CHIP TRANSCEIVER TESTING IN A RADAR SYSTEM

CROSS-REFERENCE TO RELATED APPLICATIONS

This continuation application claims priority to U.S. patent application Ser. No. 14/870,252, filed Sep. 30, 2015, which is incorporated herein by reference in its entirety.

BACKGROUND OF THE DISCLOSURE

Field of the Disclosure

Embodiments of the present disclosure generally relate to radar systems, and more specifically relates to multi-chip transceiver testing in a radar system.

Description of the Related Art

A new class of safety systems, referred to as advanced driver assistance systems (ADAS), has been introduced into automobiles to reduce human operation error. These systems are enabled by smart sensors based primarily on millimeter-wave automotive radars. The proliferation of such assistance systems, which may provide functionality such as rear-view facing cameras, electronic stability control, and vision-based pedestrian detection systems, has been enabled in part by improvements in microcontroller and sensor technologies. Enhanced embedded radar-based solutions are enabling complementary safety features for ADAS designers.

In an automotive radar system, one or more radar sensors may be used to detect obstacles around the vehicle and the speeds of the detected objects relative to the vehicle. A processing unit in the radar system may determine the appropriate action needed, e.g., to avoid a collision or to reduce collateral damage, based on signals generated by the radar sensors. Current automotive radar systems are capable of detecting objects and obstacles around a vehicle, the position of any detected objects and obstacles relative to the vehicle, and the speed of any detected objects and obstacles relative to the vehicle. Via the processing unit, the radar system may, for example, alert the vehicle driver about potential danger, prevent a collision by controlling the vehicle in a dangerous situation, take over partial control of the vehicle, or assist the driver with parking the vehicle.

Automotive radar systems are required to meet the functional safety specifications of International Standard 26262 titled "Road Vehicles—Functional Safety." ISO 26262 defines functional safety as the absence of unreasonable risk caused by malfunctioning behavior of electrical/electronic systems. Functional safety in automotive radar is the prevention of harm to humans due to failure of components in the radar. For automotive radar, the radar should be known to be functioning appropriately within a fault tolerant time interval of approximately 100 milliseconds (ms). Thus, while the vehicle is operating, a failure in any part of the radar that would lead to a degraded signal-to-noise ratio (SNR) should be detected, and an appropriate response performed within approximately 100 ms.

SUMMARY

Embodiments of the present disclosure relate to methods and apparatus for multi-chip transceiver testing in a radar system. In one aspect, a radar system is provided that includes a first radar transceiver integrated circuit (IC) including transmission signal generation circuitry operable to generate a continuous wave signal and a first transmit channel coupled to the transmission generation circuitry to receive the continuous wave signal and transmit a test signal based on the continuous wave signal, and a second radar transceiver IC including a first receive channel coupled to an output of the first transmit channel of the first radar transceiver IC via a loopback path to receive the test signal from first the transmit channel, the second radar transceiver IC operable to measure phase response in the test signal.

In one aspect, a method for measuring phase response between radar transceiver integrated circuits (IC) in a radar system is provided that includes receiving a test signal in a first receive channel of a first radar transceiver IC in the radar system, the test signal received from a first transmit channel of a second radar transceiver IC in the radar system, the first transmit channel coupled to the first receive channel via a loopback path, and measuring phase response in the test signal in the first radar transceiver IC.

BRIEF DESCRIPTION OF THE DRAWINGS

Particular embodiments will now be described, by way of example only, and with reference to the accompanying drawings.

DETAILED DESCRIPTION OF EMBODIMENTS OF THE DISCLOSURE

Figure 1:
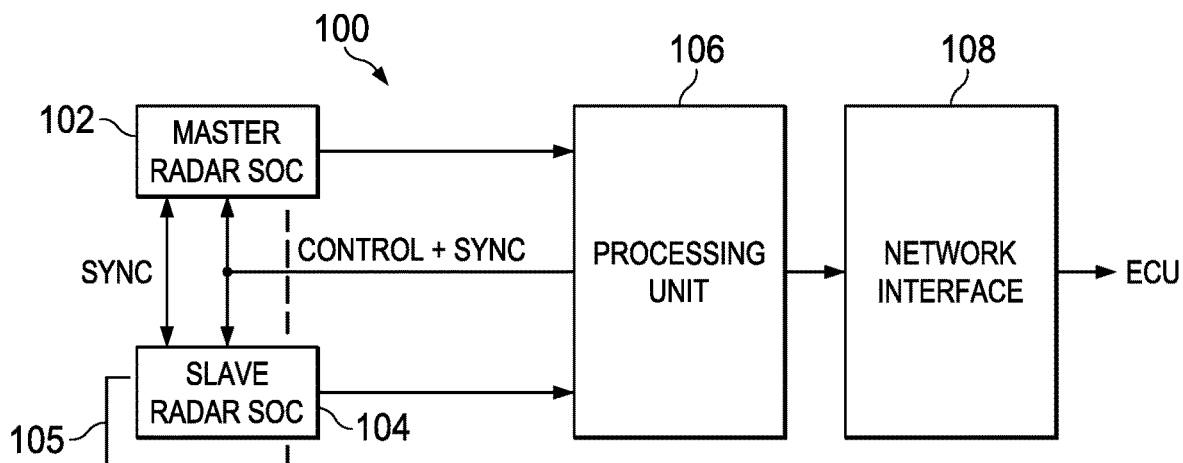
FIG. 1 is a block diagram of an example Frequency Modulated Continuous Wave (FMCW) radar system with multiple radar transceiver integrated circuits (IC)

Specific embodiments of the disclosure will now be described in detail with reference to the accompanying figures. Like elements in the various figures are denoted by like reference numerals for consistency.

Phased array radar systems with enhanced gain and accuracy can be constructed of multiple radar transceiver integrated circuits (IC), each IC having multiple receive and transmit channels, linked with a master clocking signal. In such a system, the source of the master clocking signal, i.e., the reference clock, for all the ICs may be the clock of one of the ICs, referred to as the master radar transceiver IC. The reference clock is typically a sub-multiple of the actual radar signal, i.e., the signal that is amplified and transmitted in the transmit channels and used as the local oscillator (LO) signal for down conversion paths of the receive channels. This reference clock signal is routed to each radar transceiver IC where the signal is multiplied up and buffered, then fed to a point where the signal is split between the transmit and receive channels of the radar transceiver IC.

In such radar systems, it is important that the phase delay (response) between all transmit and receive channels on all radar transceiver ICs is accurately known and measurable during radar operation in order to extract accurate data from radar signals such as angle of arrival of detected objects. Phase delay/mismatches between receive and transmit channels on an individual transceiver IC can be measured, for example, using internal loopback procedures or a built-in self test (BIST) phase detector. Examples of internal loopback procedures are described co-pending U.S. patent application Ser. No. 14/870,129, filed Sep. 30, 2015, which is incorporated by reference herein. As described in more detail in U.S. patent application Ser. No. 14/870,129, an internal loopback path couples transmit channels of a radar transceiver IC to receive channels of the radar transceiver IC. A test signal generated in a transmit channel and provided to the receive channels via the internal loopback path is used to determine phase response of each transmit channel. A BIST phase detector may be, for example, a linear mixer that multiplies the output of one transmit channel with the output of another transmit channel. After low pass filtering, the DC output will be related to the phase difference between the channels.

However, intra-IC phase measurement techniques such as internal loopbacks do not detect unexpected phase shifts introduced by the circuitry/interconnects between the master clock signal injection point and the split point between the transmit and receive channels. Such phase shifts are common to both receive and transmit paths and are thus cancelled by the receive channel down conversion operation or a BIST phase detector across transmit channels. The ability to detect these potential phase shifts allows for a more complete safety monitoring process than that achievable using only an internal loopback scheme or a BIST phase detector.

Embodiments of the disclosure provide for monitoring of radar transceiver performance across radar transceiver ICs in a cascaded radar system, i.e., a system in which the ICs are linked with a master clocking signal, as the radar system is used, e.g., in an operating vehicle. More specifically, embodiments are configured with external loopback paths between radar transceiver ICs such that the phase response between pairs of radar transceiver ICs can be measured when the radar system is operated in a test mode. The measured phase responses may be used to detect phase mismatches between radar transceiver ICs and take corrective action.

Figure 2:
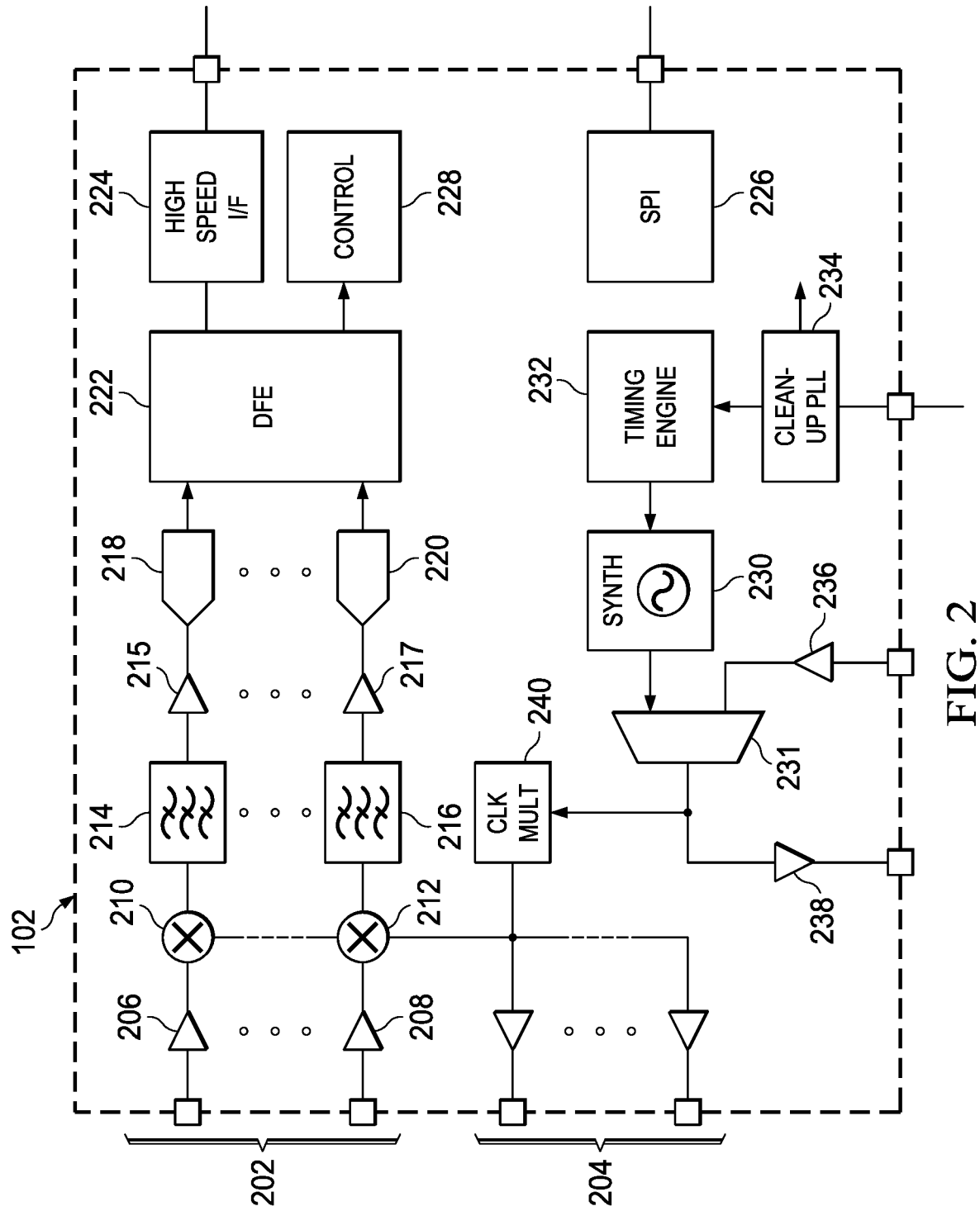
FIG. 2 is a block diagram of an example radar transceiver IC.
Figure 3:
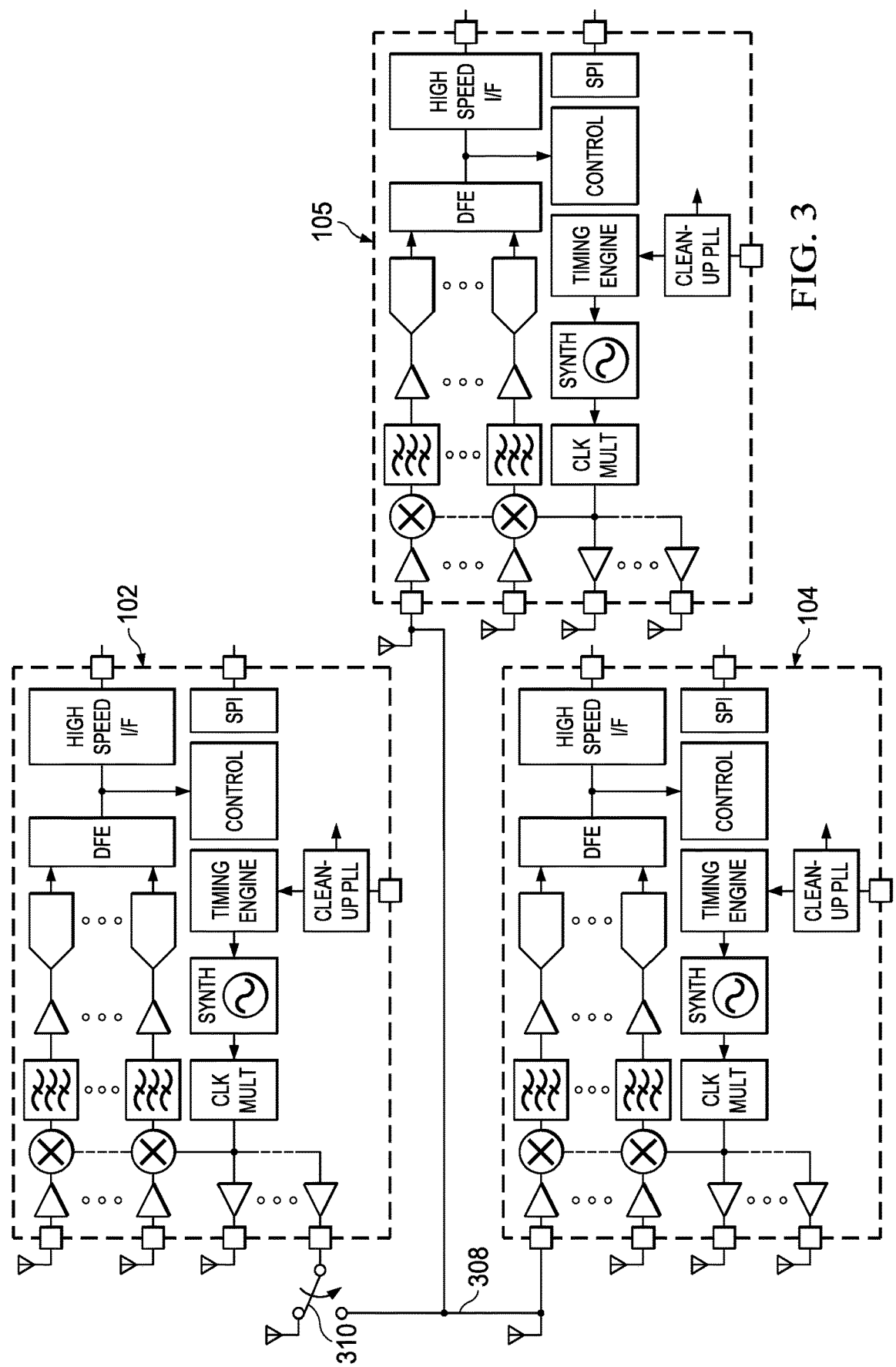
FIG. 3 is a simplified block diagram of an example embodiment of the radar system of FIG. 1 configured to monitor inter-IC radar transceiver signal phase.

FIGS. 1, 2, and 3 are block diagrams of an example phased array Frequency Modulated Continuous Wave (FMCW) radar system 100 configured to measure phase response between radar transceiver ICs during operation of the radar system 100. FIG. 1 illustrates the top level architecture of the radar system 100, FIG. 2 illustrates an example FMCW radar transceiver IC suitable for use as the master radar transceiver IC 102 and slave radar transceiver ICs 104 of FIG. 2, and FIG. 3 provides a more detailed view of the configuration of the radar system 100 for phase response measurement between the radar transceiver ICs.

Referring now to FIG. 1, the example radar system 100 includes a master radar transceiver IC 102, two slave radar transceiver ICs 104, 105, a processing unit 106, and a network interface 108. The master radar IC 102 and the slave radar ICs 104, 105 each have the architecture of the example FMCW radar transceiver IC of FIG. 2. Further, the master radar transceiver IC 102 is coupled to the slave radar ICs 104, 105 to synchronize the operation of the slave radar transceiver ICs 104, 105 with that of the master radar transceiver IC 102. The master radar IC 102 and the slave radar ICs 104, 105 are referred to collectively herein as the radar system frontend or the frontend.

The processing unit 106 is coupled to the master radar transceiver IC 102 and the slave radar transceiver ICs 104, 105 via a serial interface to receive data from the radar ICs. In some embodiments, the serial interface may be a high speed serial interface such as a low-voltage differential signaling (LVDS) interface. In some embodiments, the serial interface may be lower speed serial peripheral interface (SPI). As is explained in more detail in reference to FIG. 2, each radar SOC 102, 104 includes functionality to generate multiple digital beat signals (alternatively referred to as dechirped signals, intermediate frequency (IF) signals, or raw radar signals) that are provided to the processing unit 106 via the high speed serial interface.

The processing unit 106 includes functionality to process the received beat signals to determine, for example, distance, velocity, and angle of any detected objects. The processing unit 106 may also include functionality to perform post processing of the information about the detected objects, such as tracking objects, determining rate and direction of movement, etc. The processing unit 106 may include any suitable processor or combination of processors as needed for the processing throughput of the application using the radar data. For example, the processing unit 106 may include a digital signal processor (DSP), a microcontroller (MCU), an SOC combining both DSP and MCU processing, or a field programmable gate array (FPGA) and a DSP.

The processing unit 106 provides control information as needed to one or more electronic control units in the vehicle via the network interface 108. Electronic control unit (ECU) is a generic term for any embedded system in a vehicle that controls one or more the electrical system or subsystems in the vehicle. Types of ECU include, for example, electronic/engine control module (ECM), powertrain control module (PCM), transmission control module (TCM), brake control module (BCM or EBCM), central control module (CCM), central timing module (CTM), general electronic module (GEM), body control module (BCM), and suspension control module (SCM).

The network interface 108 may implement any suitable protocol, such as, for example, the controller area network (CAN) protocol, the FlexRay protocol, or Ethernet protocol.

Referring now to FIG. 2, the example FMCW radar transceiver IC depicted is configured to be used as any of the radar transceiver ICs in the radar system 100. The radar transceiver IC may include multiple transmit channels 204 for transmitting FMCW signals and multiple receive channels 202 for receiving the reflected transmitted signals. Further, the number of receive channels may be larger than the number of transmit channels. For example, an embodiment of the radar transceiver IC may have three transmit channels and four receive channels.

A transmit channel includes a suitable transmitter and antenna. A receive channel includes a suitable receiver and antenna. Further, each of the receive channels 202 are identical and include a mixer 210, 212 to mix the transmitted signal with the received signal to generate a beat signal, i.e., an intermediate frequency (IF) signal, a baseband bandpass filter 214, 216 for filtering the beat signal, a variable gain amplifier (VGA) 215, 217 for amplifying the filtered beat signal, and an analog-to-digital converter (ADC) 218, 220 for converting the analog beat signal to a digital beat signal. The bandpass filter, VGA, and ADC of a receive channel may be collectively referred to as a baseband chain or baseband filter chain.

The receive channels 202 are coupled to a digital front end (DFE) 222 that performs decimation filtering on the digital beat signals to reduce the data transfer rate. The DFE 222 may also perform other operations on the digital beat signals, e.g., DC offset removal. The DFE 222 is coupled to a high speed serial interface (I/F) 224 that transfers the output of the DFE 222 to the processing unit 106 when the radar transceiver IC is operated in normal mode. Further, the DFE 222 is coupled to the control module 228 to provide test signals to the control module 228 when the radar transceiver IC is operated in test mode.

The control module 228 includes functionality to control the operation of the radar transceiver IC in normal mode and in test mode. The control module 228 may include, for example, a buffer to store the output samples of the DFE 222, an FFT (Fast Fourier Transform) engine to compute spectral information of the buffer contents, and an MCU that executes firmware to control the operation of the radar transceiver IC in normal mode and in test mode. Functionality of the control module 228 is described in more detail in reference to the method of FIG. 4.

The serial peripheral interface (SPI) 226 provides an interface for communication with the processing unit 106. For example, the processing unit 106 may use the SPI 226 to send control information, e.g., timing and frequencies of chirps, output power level, triggering of monitoring functions such as phase noise monitoring, etc., to the radar SOC 200. The radar transceiver IC may use the SPI 226, for example, to send the inter-chip phase response measurements and the results of other monitoring functions to the processing unit 106.

The programmable timing engine 232 includes functionality to receive chirp parameter values for a sequence of chirps in a radar frame from the control module 228 and to generate chirp control signals that control the transmission and reception of the chirps in a frame based on the parameter values. The chirp parameters are defined by the radar system architecture and may include, for example, a transmitter enable parameter for indicating which transmitters to enable, a chirp frequency start value, a chirp frequency slope, an analog-to-digital (ADC) sampling time, a ramp end time, a transmitter start time, etc.

The radio frequency synthesizer (SYNTH) 230 includes functionality to generate FMCW signals for transmission based on chirp control signals from the timing engine 232. In some embodiments, the SYNTH 230 includes a phase locked loop (PLL) with a voltage controlled oscillator (VCO). If the radar transceiver IC is used as a slave radar transceiver IC 104, 105, the SYNTH 230 is not active when the radar system frontend is operating in normal mode. Instead, the SYNTH 230 in the master radar transceiver IC 102 provides the FMCW signals to be transmitted to the slave radar transceiver ICs 104, 105 via an output buffer 238 coupled to an input buffer 236 on each of the slave radar transceiver ICs 104, 105.

The multiplexer 231 is coupled to inputs of the SYNTH 230 and the input buffer 236. The multiplexer 231 is configurable to select between signals received in the input buffer 236 and signals generated by the SYNTH 230. The output buffer 238 is coupled to an output of the multiplexer 231 and may be used transmit signals selected by the multiplexer 232 to an external device.

The clock multiplier 240 increases the frequency of the transmission signal to the frequency of the mixers 206, 208. The clean-up PLL (phase locked loop) 234 operates to increase the frequency of the signal of an external low frequency reference clock (not shown) to the frequency of the SYNTH 230 and to filter the reference clock phase noise out of the clock signal.

The clock multiplier 240, synthesizer 230, timing generator 232, and clean up PLL 234 are an example of transmission generation circuitry. The transmission generation circuitry generates a radio frequency (RF) signal as input to the transmit channels and as input to the mixers in the receive channels via the clock multiplier.

Referring now to FIG. 3, configuration of the radar system of FIG. 1 for phase response monitoring between the radar transceiver ICs 102, 104, 105 is illustrated. A receive channel of the slave radar transceiver IC 104 and a receive channel of the slave radar transceiver IC 105 are coupled to a transmit channel of the master radar transceiver IC 102 via a loopback path 308. The loopback path 308 may be used when the radar transceiver ICs 102, 104, 105 are operated in test mode to provide a test signal generated on the master radar transceiver IC 102 to the coupled receive channels of the slave radar transceiver ICS 104, 105 via the coupled transmit channel.

In the depicted embodiment, the loopback path 308 includes a switch 310 that may be configured to provide a signal to the antenna of the transmit channel when the master radar transceiver IC 102 is operated in normal mode and to the loopback path 308 when the master transceiver IC 102 is operated in test mode. In other embodiments, a transmit channel on the master transceiver IC 102 may be dedicated to use solely in test mode, in which case the switch 310 is not present and no antenna is needed.

Figure 4:
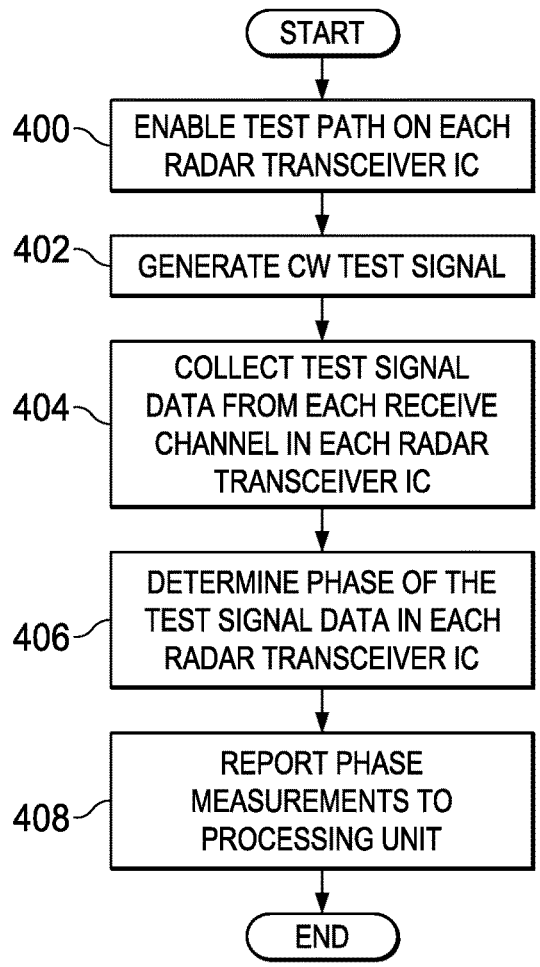
FIG. 4 is a flow diagram of a method for monitoring inter-IC radar transceiver signal phase using external loopbacks.

FIG. 4 is a flow diagram of a method for monitoring inter-IC radar transceiver signal phase using an external loopback path, e.g., the external loopback path of FIG. 3. Initially, the test path for measuring the signal phase is enabled 400 by the control module on each of the radar transceiver ICs 102, 104, 105. On the master transceiver IC 102, the test path includes the timing engine, the SYNTH, and the transmit channel coupled to the external loopback path 308. In embodiments in which the switch 310 is present, enabling the test path on the master radar transceiver IC 102 includes setting the switch to pass the signal from the transmit channel to the loopback path 308. On the slave transceiver ICs 104, 105, the test path includes the respective receive channel coupled to the loopback path 308. The other receive channels and transmit channels may not be enabled.

The control module of the master radar transceiver IC 102 further causes the generation 402 of a continuous wave (CW) signal that passes through the transmit channel coupled to the external loopback path 308 to the receive channels on the slave radar transceiver ICs 104, 105 coupled to the loopback path 308. Modulation is applied to the CW signal by a modulation component to generate a CW test signal such that the signal is separated from DC in each receive channel. The modulation component may be, for example, an off keying (OOK) modulator, a binary phase shift keying (BPSK) modulator, a double sideband (DSB) modulator, or a single sideband (SSB) modulator.

For example, a transmit channel may include a signal power amplifier chain of a pre-power amplifier (PPA) coupled to the SYNTH 230 to receive a signal, a modulation component coupled to the PPA to receive the amplified signal, and a power amplifier (PA) coupled to the modulation component to receive the modulated signal. In such a configuration, the modulation component may be a BPSK modulator, a DSB modulator, or an SSB modulator. In some embodiments, a modulation component may be coupled in the loopback path at the output of the PA. In such embodiments, the modulation component may also be an OOK modulator.

The control module on each of the slave radar transceiver ICs 104, 105 collects 404 a digital test data signal from the respective receive channel via the respective DFE. The data collection from the receive channel on each slave radar transceiver IC 104, 105 is performed simultaneously and synchronously, i.e., the data collection on each slave radar transceiver IC 104, 105 is initiated as close as possible to the same time. Further, the data collection on each slave transceiver IC 104, 105 is started synchronously with respect to the modulation of the signal in the transmit channel.

The control module on each of the radar transceiver ICs 104, 105 performs a Fast Fourier Transform (FFT) on the respective test data signal and determines 406 the phase θ of the test data signal. For example, in some embodiments, the control module 228 performs a Fast Fourier Transform (FFT) on the digital test data signal and determines the phase. The phase may be determined as follows. Assume for ease of explanation that Ns samples of ADC data are collected at a sampling rate Fs, e.g., Ns=1024 and Fs=10.24 MHz, and an Ns point FFT is performed to produce Ns FFT output complex samples referred to as FFTOut[0, 1, 2, . . . Ns−1]. The FFT output sample index, indx, corresponding to the test data signal of frequency IF is given by IF/Fs*Ns. The value of FFTOut[indx] is a complex number, denoted by X+jY. The phase θ is given by θ=arctan(Y/X). In other embodiments, in the DFE, the modulated frequency is downconverted to DC, and the phase is extracted via I/Q estimation logic, i.e., by separately estimating the offset on each I and Q path after the relevant tone is at DC.

The phase values are reported 408 to the processing unit 106. The processing unit 106 may use the reported phase values to identify phase response mismatches between the radar transceiver ICs 102, 104, 105. The phase response mismatch between a transmit channel on the master radar transceiver IC 102 and a transmit channel on a slave radar transceiver IC may be computed as $$\text{PhaseMismatch}_{i,j} = \theta_i - \theta_j$$

where $\theta_i$ is the phase response of the master transmit channel as measured by the above method and $\theta_j$ is the internal phase response of the slave transmit channel. The internal phase response of a slave transmit channel may be measured using, e.g., a BIST phase detector or an internal loopback process as described in U.S. patent application Ser. No. 14/870,129.

The phase mismatches of the other transmit channels on a slave radar transceiver IC and the transmit channel on the master transceiver IC may then be determined relative to the internal phase mismatches between the slave transmit channels. More specifically, the phase mismatch between the master transmit channel and another slave transmit channel is the sum of the above computed phase mismatch and the internal phase mismatch between the phase of the slave transmit channel used to compute the above phase mismatch and the phase of the other slave transmit channel.

For example, let dPM1S1 be the phase mismatch between the master slave transmit channel (M1) and a slave transmit channel (S1) as computed per the above equation. And, let dPS1S2 be the internal phase mismatch between the S1 slave transmit channel and another slave transmit channel (S2). The phase mismatch between the two slave transmit channels may be computed as per the above equation in which $\theta_i$ is the internal phase response of the S1 slave transmit channel and $\theta_j$ is the internal phase response of the S2 slave transmit channel. The phase mismatch between the master slave transmit channel M1 and the S2 slave transmit channel may be computed as $$dP_{M1S2} = dP_{M1S1} + dP_{S1S2}.$$

If there is a third slave transmit channel (S3), the phase mismatch between the master slave transmit channel M1 and the S3 transmit channel may be computed as $$dP_{M1S3} = dP_{M1S1} + dP_{S1S3}$$

where $dP_{S1S3}$ is the internal phase mismatch between the S1 slave transmit Channel and the S3 slave transmit channel.

Other Embodiments

While the disclosure has been described with respect to a limited number of embodiments, those skilled in the art, having benefit of this disclosure, will appreciate that other embodiments can be devised which do not depart from the scope of the disclosure as disclosed herein.

For example, embodiments have been described herein in which the phased array radar system has two slave radar transceiver ICs. One of ordinary skill in the art will understand embodiments in which the radar system includes a single slave radar transceiver IC or more than two slave radar transceiver ICs.

In another example, embodiments have been described herein in which the radar transceiver ICs in the front end of the cascaded radar system have a master slave relationship. One of ordinary skill in the art will understand embodiments in which the radar transceiver ICs do not have a master slave relationship, e.g., an external PLL is used to provide signals to all of the radar transceiver ICs.

In another example, embodiments have been described herein in which one radar transceiver IC provides the test signal to the other radar transceiver ICs. One of ordinary skill in the art will understand embodiments in which each radar transceiver IC provides a test signal to the next radar transceiver IC in a "daisy chain" configuration.

In another example, embodiments have been described herein in which the transmit channel used for the inter-IC phase response measurement is on the master radar transceiver IC. One of ordinary skill in the art will understand embodiments in which a transmit channel on another IC in the radar system is used instead.

In another example, embodiments have been described herein in which the transmission signal generation circuitry includes a radio frequency synthesizer. One of ordinary skill in the art will understand embodiments in which this circuitry is an open loop oscillator (radio frequency oscillator) plus a digital-to-analog converter (DAC) or other suitable transmission signal generation circuitry.

In another example, embodiments have been described herein in which an internal FFT engine in a control module is used in the computation of the phase of the received test signal. One of ordinary skill in the art will understand embodiments in which the phase is measured by an IQ estimation logic block in the DFE.

In another example, embodiments have been described herein in which the phase measurement processing is performed in the control module of the slave radar transceiver ICs. One of ordinary skill in the art will understand embodiments in which some or all of the phase measurement processing is performed external to the slave ICs, e.g., by the processing unit or by an external MCU.

In another example, embodiments have been described herein in which a clock multiplier is used. One of ordinary skill in the art will understand embodiments in which the multiplier is not needed because the SYNTH operates at the LO frequency rather than a lower frequency.

In another example, embodiments have been described herein in which the transmit channel used in the loopback path is either dedicated for use in test mode or there is a switch between the transmit channel and the antenna. One of ordinary skill in the art will understand embodiments in which the receive channels used are either dedicated for use in test mode or may have switches between the respective antennae and the receive channels. In such embodiments, the transmit channel coupled to the loopback path may not be dedicated or switched.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

Certain terms are used throughout the description and the claims to refer to particular system components. As one skilled in the art will appreciate, components in radar systems may be referred to by different names and/or may be combined in ways not shown herein without departing from the described functionality. This document does not intend to distinguish between components that differ in name but not function. In the above discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the disclosure.

What is claimed is:

1. A radar system, comprising:
a first radar transceiver integrated circuit (IC) including a first transmit channel, the first transmit channel including an output; and
a second radar transceiver IC including a first receive channel, an input of the first receive channel coupled to the output of the first transmit channel of the first radar transceiver IC via a loopback path.

2. The radar system of claim 1, further comprising:
a third radar transceiver IC including a second receive channel coupled to the output of the first transmit channel of the first radar transceiver IC via the loopback path.

3. The radar system of claim 1, wherein the first radar transceiver IC is configured to transmit a test signal at the first transmit channel and the second radar transceiver IC is configured to:
receive the test signal;
measure a phase response of the test signal; and
determine a phase mismatch between the first transmit channel and a second transmit channel of the second radar transceiver IC based on a difference between the phase response of the test signal and an internal phase response of the second transmit channel.

4. The radar system of claim 3, in which the internal phase response of the second transmit channel is determined using one of an internal loopback path coupling the second transmit channel to a receive channel on the second radar transceiver IC, and a built-in self test (BIST) phase detector.

5. The radar system of claim 3, in which phase mismatch between the first transmit channel and a third transmit channel of the second radar transceiver IC is determined as a sum of the phase response and phase mismatch between the second transmit channel and the third transmit channel.

6. The radar system of claim 1, in which the loopback path includes a switch coupled to the output of the first transmit channel, the switch operable to provide an output signal of the first transmit channel to an antenna of the first transmit channel when the first radar transceiver IC is operated in normal mode and to the loopback path when the first radar transceiver IC is operated in test mode.

7. The radar system of claim 1, in which the first transmit channel is used only when the first radar transceiver IC is operated in test mode to provide a test signal to the loopback path.

8. The radar system of claim 2, in which the loopback path includes a switch coupled to an input of the second receive channel, the switch operable to provide a signal received by an antenna of the second receive channel to the second receive channel when the second radar transceiver IC is operated in normal mode, and to provide a signal from the loopback path to the second receive channel when the second radar transceiver IC is operated in test mode.

9. The radar system of claim 2, in which the second receive channel is used only when the second radar transceiver IC is operated in test mode to receive a test signal from the loopback path.

10. The radar system of claim 1, in which the first radar transceiver IC is a master radar transceiver IC and the second radar transceiver IC is a slave radar transceiver IC.

11. A method comprising:
transmitting, by a second radar transceiver integrated circuit (IC) in a radar system, at a first transmit channel over a loopback path, a test signal; and
receiving the test signal, by a first receive channel of a first radar transceiver IC in the radar system.

12. The method of claim 11, further comprising:
measuring, by the first radar transceiver IC, a phase response in the test signal;
receiving the test signal in a second receive channel of a third radar transceiver IC in the radar system, the first transmit channel coupled to the second receive channel via the loopback path; and
measuring phase response in the test signal in the third radar transceiver IC.

13. The method of claim 12, including determining phase mismatch between the first transmit channel and a second transmit channel of the first radar transceiver IC as a difference between the phase response and internal phase response of the second transmit channel.

14. The method of claim 13, in which the internal phase response of the second transmit channel is determined using one of an internal loopback path coupling the second transmit channel to a receive channel on the first radar transceiver IC, and a built-in self test (BIST) phase detector.

15. The method of claim 13, including determining phase mismatch between the first transmit channel and a third transmit channel of the first radar transceiver IC as a sum of the phase response and phase mismatch between the second transmit channel and the third transmit channel.

16. The method of claim 11, including setting a switch in the loopback path to direct the test signal to the first receive channel.

17. The method of claim 16, in which the switch is operable to provide an output signal of the first transmit channel to an antenna of the first transmit channel when the second radar transceiver IC is operated in normal mode and to the loopback path when the second radar transceiver IC is operated in test mode.

18. The method of claim 16, in which the switch is operable to provide a signal received by an antenna of the first receive channel to the first receive channel when the first radar transceiver IC is operated in normal mode, and to provide a signal from the loopback path to the first receive channel when the first radar transceiver IC is operated in test mode.

19. The method of claim 11, in which the first transmit channel is used only when the second radar transceiver IC is operated in test mode.

20. The method of claim 11, in which the first receive channel is used only when the first radar transceiver IC is operated in test mode.

* * * * *